(12) United States Patent
Broden et al.

(10) Patent No.: US 7,080,558 B2
(45) Date of Patent: Jul. 25, 2006

(54) PROCESS SEAL FOR PROCESS CONTROL TRANSMITTER

(75) Inventors: David A. Broden, Andover, MN (US); Daniel A. Norberg, Fridley, MN (US)

(73) Assignee: Rosemount Inc., Eden Prairie, MN (US)

( * ) Notice: Subject to any disclaimer, the term of this patent is extended or adjusted under 35 U.S.C. 154(b) by 120 days.

(21) Appl. No.: 10/679,907

(22) Filed: Oct. 6, 2003

(65) Prior Publication Data

US 2005/0072243 A1 Apr. 7, 2005

(51) Int. Cl.
*G01L 9/00* (2006.01)
(52) U.S. Cl. .................................................. 73/706
(58) Field of Classification Search ............... 73/706, 73/756, 700; 361/283
See application file for complete search history.

(56) References Cited

U.S. PATENT DOCUMENTS

| | | | |
|---|---|---|---|
| 3,974,855 A | 8/1976 | Webb | 137/527 |
| 4,005,848 A | 2/1977 | Eggleston | 251/173 |
| 4,046,010 A | 9/1977 | Akeley | 73/406 |
| 4,231,546 A | 11/1980 | Eggleston et al. | 251/173 |
| 4,798,089 A | 1/1989 | Frick et al. | 73/706 |
| 4,833,922 A | 5/1989 | Frick et al. | 73/756 |
| 4,993,754 A | 2/1991 | Templin, Jr. | 285/189 |
| 5,094,109 A | 3/1992 | Dean et al. | 73/718 |
| 5,095,755 A | 3/1992 | Peterson | 73/706 |
| 5,184,514 A | 2/1993 | Cucci et al. | 73/706 |
| 5,427,358 A | 6/1995 | Eggleston et al. | 251/367 |
| 5,487,527 A | 1/1996 | Eggleston | 251/62 |
| 5,524,492 A | 6/1996 | Frick et al. | 73/706 |
| 5,922,965 A * | 7/1999 | Behm et al. | 73/706 |
| 5,955,675 A * | 9/1999 | Peterson | 73/706 |
| 6,038,961 A * | 3/2000 | Filippi et al. | 92/98 R |
| 6,055,863 A * | 5/2000 | Behm et al. | 73/706 |
| 6,539,808 B1* | 4/2003 | Saenz et al. | 73/756 |
| 2002/0014123 A1* | 2/2002 | Saenz et al. | 73/715 |

FOREIGN PATENT DOCUMENTS

EP 0 403 256 A2 12/1990
JP 2280026 11/1990

* cited by examiner

*Primary Examiner*—Edward Lefkowitz
*Assistant Examiner*—Andre Allen

(57) ABSTRACT

A process seal for a process control transmitter is provided. The seal includes a contact region which provides a metal to metal seal against a coupling flange.

24 Claims, 4 Drawing Sheets

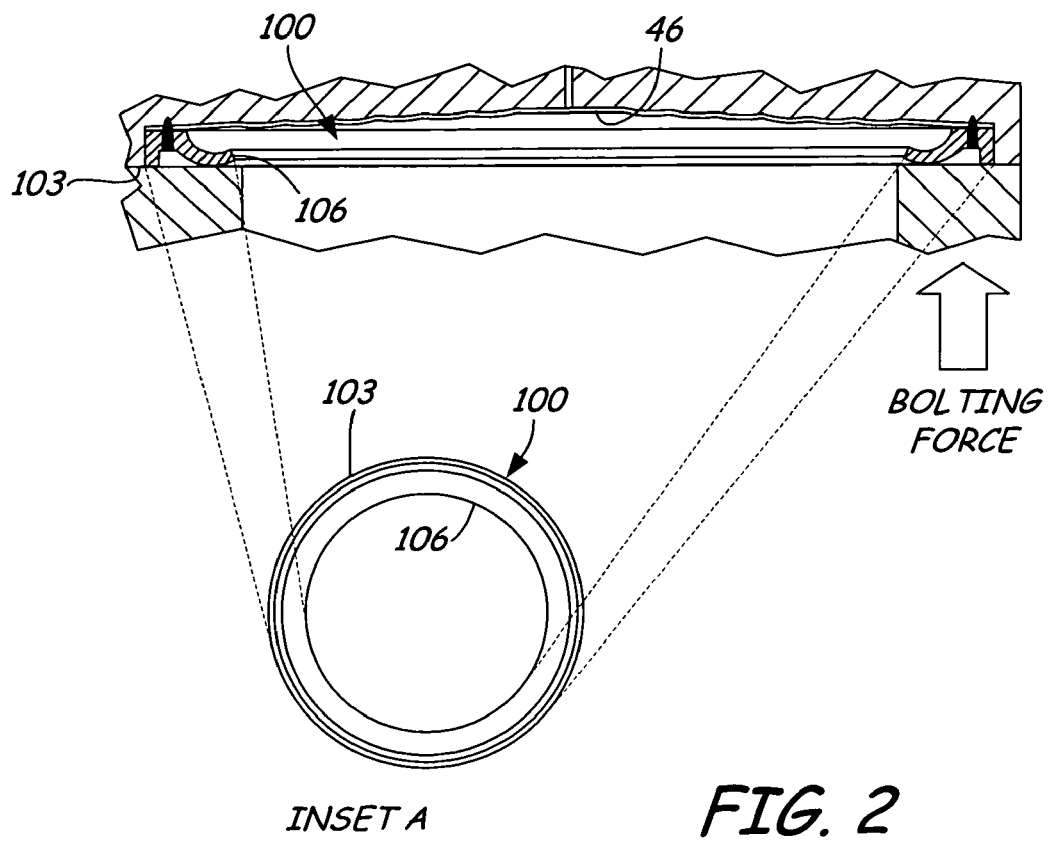
INSET A  FIG. 2
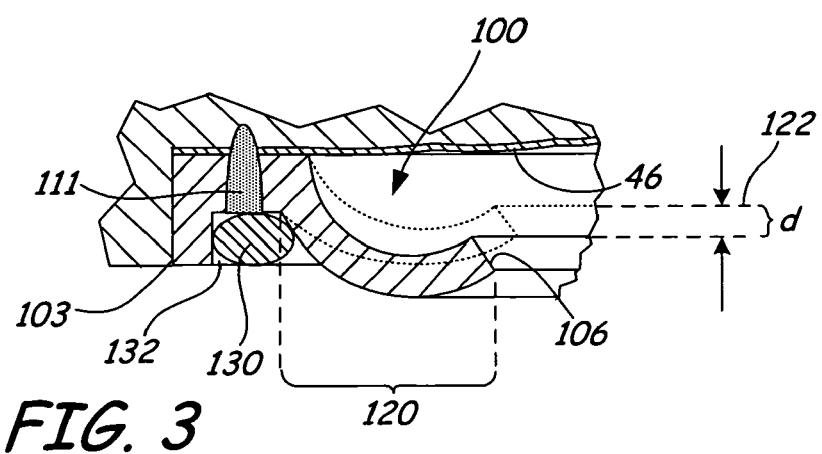
FIG. 3

PROCESS SEAL FOR PROCESS CONTROL TRANSMITTER

BACKGROUND OF THE INVENTION

The present invention relates to a process control transmitter. In particular, it relates to a process seal for a process control transmitter.

Transmitters which sense pressure typically have a pressure sensor coupled to at least one isolation diaphragm. The isolation diaphragm isolates the pressure sensor from corrosive process fluids being sensed. Pressure is transferred from the isolation diaphragm to the sensor having a sensing diaphragm through a substantially incompressible isolation fluid carried in a passageway. U.S. Pat. No. 4,833,922 entitled MODULAR PRESSURE TRANSMITTER and U.S. Pat. No. 5,094,109 entitled PRESSURE TRANSMITTER WITH STRESS ISOLATION DEPRESSION show pressure transmitters of this type.

The process fluid sealing mechanism for a transmitter should be operable in a wide range of chemical environments, temperature ranges and stress conditions and work well over a broad range of pressures. Teflon® and other fluorocarbons are among the preferred sealing compounds. Hastelloy®, 316 stainless steel and other corrosion resistant materials are preferred as construction materials for wetted surfaces. While these materials have very good corrosion resistance properties, their mechanical properties, such as yield strength of the corrosion resistant alloys and the resistance to extrusion of the sealing materials, are marginal at best. Sealing material tends to extrude when subjected to high pressures and temperatures. For this reason, the sealing material must be treated as a gasket. To form effective seals with gaskets, it is usually necessary to have a sealing material with a large surface area under significant compression. The stress from compression is mechanically coupled to the isolation diaphragm and ultimately to the sensing diaphragm of the pressure transmitter. The amount of stress can vary over time as mounting bolts loosen or are re-torqued, and as the gasket sealing material extrudes. These changes result in instabilities in the pressure sensor output.

To minimize the stress coupled to the process isolation diaphragm, it is preferred to separate the diaphragm from the sealing mechanism to provide stress isolation. However, practical considerations make stress isolation of the diaphragm difficult. Industry standards and the requirement of backward compatibility with existing products dictate the size, location and pattern of the bolts and pressure ports of the assembly. The overall geometry of the transmitter limits the space that must be shared by the process sealing gaskets and the isolating diaphragms. The process isolation diaphragms must fit within the boundaries defined by the bolt pattern. Space within the bolt boundary used for sealing is generally unavailable for isolation diaphragms. It is frequently undesirable to reduce the size of the isolation diaphragms because smaller isolation diaphragms are more sensitive to stress coupling and therefore instabilities result.

Tradeoffs must typically be made among the several competing needs of the pressure transmitter design: 1) the need for large compliant diaphragms; 2) the need for diaphragms that are well isolated from the stresses of the sealing mechanism; 3) the need for a sealing mechanism that has sufficient surface area; 4) the need for a sealing mechanism held together with sufficient force to be reliable; and 5) the constraint that all structures fit within the boundary defined by the bolt pattern.

One technique which addresses some of these concerns is shown and described in U.S. Pat. No. 5,955,675, which issued Sep. 21, 1999 to Peterson entitled SELF ENERGIZING PROCESS SEAL FOR PROCESS CONTROL TRANSMITTER which is commonly assigned with the present application. This reference describes a technique in which process pressure is used to assist in sealing a process seal to a flange. The process seal has a ring shape and sealing material is coupled to the ring along its inner diameter. The ring is adapted to force the sealing material into contact with the flange to prevent process fluid from leaking past the seal.

SUMMARY OF THE INVENTION

The present invention provides a process seal for a process control transmitter. The seal includes an outer diameter region and an inner diameter. An arched region is positioned between the inner diameter and the outer diameter region. In one aspect, a metal to metal seal is provided for sealing a process transmitter to a coupling flange.

BRIEF DESCRIPTION OF THE DRAWINGS

FIG. 2 is a cross-sectional view of a portion of the transmitter in flange in FIG. 1 which illustrates a seal.

FIG. 3 is a more detailed cross-sectional view of the seal shown in FIG. 2.

DETAILED DESCRIPTION

Figure 1:
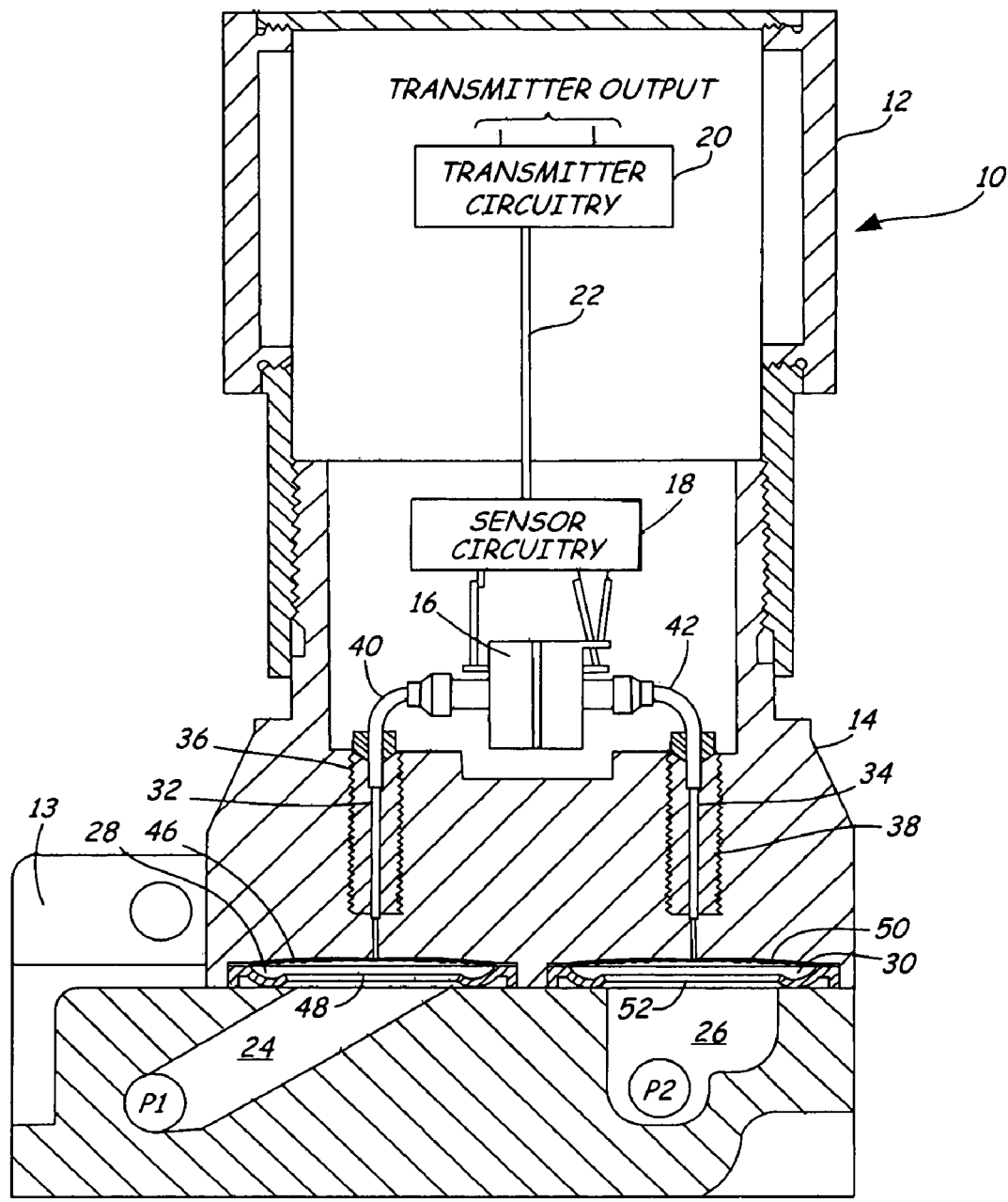
FIG. 1 is a cross-sectional fragmentary view of a pressure transmitter having a process seal in accordance with the present invention.

FIG. 1 shows an exemplary pressure transmitter 10 having transmitter body 12, coupling flange or manifold 13 and sensor body 14 in accordance with the present invention. Although the present invention is shown with a Coplanar™ flange, the invention may be used with any type of flange, manifold, or other coupling adapted to receive process fluid. Sensor body 14 includes pressure sensor 16, and transmitter body 12 includes transmitter circuitry 20. Sensor circuitry 18 is coupled to transmitter circuitry 20 through communication bus 22. Transmitter circuitry 20 sends information related to pressure of the process fluid over a communication link such as a two wire process control loop 23 (or circuit). The transmitter 10 may be wholly powered over the control loop 23 by a controller 25.

In this one embodiment of a transmitter, pressure sensor 16 measures a difference in pressure between pressure P1 in passageway 24 and pressure P2 in passageway 26 of flange 13. Pressure P1 is coupled to sensor 16 through passageway 32. Pressure P2 is coupled to sensor 16 through passageway 34. Passageway 32 extends through coupling 36 and tube 40. Passageway 34 extends through coupling 38 and tube 42. Passageways 32 and 34 are filled with a relatively incompressible fluid such as oil. Couplings 36 and 38 are threaded into sensor body 14 and provide a long flame-quenching path between the interior of the sensor body carrying sensor circuitry 18 and process fluid contained in passageways 24 and 26.

Passageway 24 is positioned adjacent to opening 28 in sensor body 14. Passageway 26 is positioned adjacent to opening 30 in sensor body 14. Diaphragm 46 is positioned in opening 28 and is coupled to sensor body 14 adjacent to passageway 24. Passageway 32 extends through coupling 36 and sensor body 14 to diaphragm 46. Diaphragm 50 is coupled to sensor body 14 adjacent to passageway 26. Passageway 34 extends through coupling 38 and sensor body 14 to diaphragm 50.

In operation, flange 13 presses against seals 48 and 52 when transmitter 10 is bolted to flange 13. Seal 48 is seated on sensor body 14 adjacent to opening 24 and diaphragm 46, and prevents process fluid leakage from passageway 24 and opening 28 past flange 13 to the outside environment. Similarly, seal 52 is coupled to sensor body 14 adjacent to opening 26 and diaphragm 50, and prevents process fluid leakage from passageway 26 and opening 30 past flange 13 to the outside environment. Seals 48 and 52 according to the present invention are preferably identical. Seal 48 is discussed in greater detail below with reference to FIGS. 2–5.

The invention provides advantages over the prior art sealing techniques including: 1) reducing the force needed to provide an effective seal; 2) making the sealing force largely independent of the force provided by the tension in the bolts that couple the transmitter to a process flange; 3) using the process pressure itself to provide force for sealing at high pressures; 4) relaxing the requirements that materials having excellent mechanical properties be used in manufacturing the ring so that materials having improved corrosive properties can be used; and 5) the ability to seal process fluid at extremely high pressure, for example, in excess of 10,000 psi.

Typical prior art seal designs require a non-metallic material such as o-rings and PTS gaskets. These materials are not well suited for long term use over pressure and temperature extremes. The present invention provides a metal to metal seal for use in process devices to address problems associated with non-metallic seals.

FIG. 2 is a cross sectional view of a portion of transmitter 14 and flange 13 showing a seal 100. FIG. 3 is a detailed cross sectional view of seal 100 coupling to transmitter 14. The seal 100 is adapted to be positionable against the surface of flange 13 for preventing process fluid from leaking past the flange. As illustrated in inset A of FIG. 2, which is a top plan view of seal 100, the seal 100 comprises a ring having an outer diameter 103 and an inner diameter 106. The metal ring is preferably formed of a spring material having suitable corrosion resistance to allow exposure to the process fluid. For example, cold worked stainless steel or metal sold under the tradename Inconel, a high strength non-magnetic steel may be used. The seal ring 100 can be plated with a ductile material such as nickel. Another example material is silver. Such a plating can provide a sealing of the process fluid at low pressure. As the process pressure increases, the configuration of the ring 100 causes additional pressure to be applied to the seal. This counteracts the "unloading" of the bolt pre-load force caused by the pressure which pushes the flange 13 and transmitter 14 apart. As shown in FIG. 3 in greater detail, the ring 100 is configured to extend beyond the plane of the surface of the flange 13 when unloaded or relaxed (i.e., not coupled to the flange 13). The spring force when the flange 13 is mounted to the transmitter prevents process fluid leakage at low pressure while the self-energizing feature prevents process fluid leakage at high pressure. A weld 111 secures ring 100 to body 14. Any appropriate weld or bonding technique can be used.

In accordance with one aspect of the invention, the seal 100 includes a middle portion 120 which is positioned generally between the outer diameter 103 and the inner diameter 106. The middle portion 120 has a generally annularly shape conforming to the general shape of seal 100 and has an arch that is illustrated in the cross sectional view of FIG. 3. The arch curves in a direction away from the flange 13 such that when flange 13 is brought into contact with the seal 100, the face of flange 13 contacts a distal most portion of the arch formed by middle portion 120. This contact mounting force causes the middle portion 120 to deflect to the position identified as 122 in FIG. 3 a distance d.

The middle portion 120 of seal 100 is coated with a ductable material such as nickel. For example, the ductable material can be plated onto the ring 100 using known techniques. The thickness of the ductable material should be sufficient to withstand wear from general use over the expected lifespan of the device. Coating thickness may typically be 0.001 to 0.005 inches. The spring loaded force of the middle portion 120 against the face of flange 13 causes the ductable material to seal against the metal face of the flange 13. For example, the flange 13 may comprise stainless steel or other appropriate metal.

In another aspect of the present invention, an optional sealing gasket material 130 can extend around an outer depression 132 of ring 100. The outer depression 132 extends generally around the outer circumference of the ring 100. The sealing material 102 can be any appropriate material including, for example, glass filled Teflon®, graphite filled Teflon®, Viton®, or other materials known in the art for producing O-rings or the like.

The sealing material 130 can provide additional sealing against processed fluid which is particularly effective at lower process pressures. Thus, the metal to metal seal provided by middle portion 120 against the face of the flange 13 provides sealing of process fluid at high pressure while the sealing material 130 provides sealing of process fluid at lower pressure.

Although the middle portion 120 is illustrated as having an arch, other configurations may also be used in which a portion of the ring 100 protrudes in a direction toward the face of the flange 13 and is configured to contact the face of the flange 13. In one aspect, the contacting portion has a curved profile.

Figure 4A:
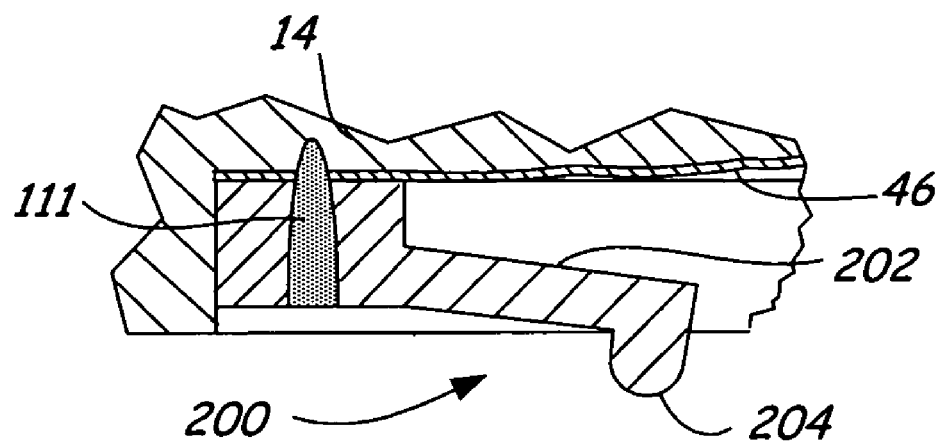
FIGS. 4A and 4B are cross-sectional views of a seal in accordance with another embodiment of the present invention.
Figure 4B:
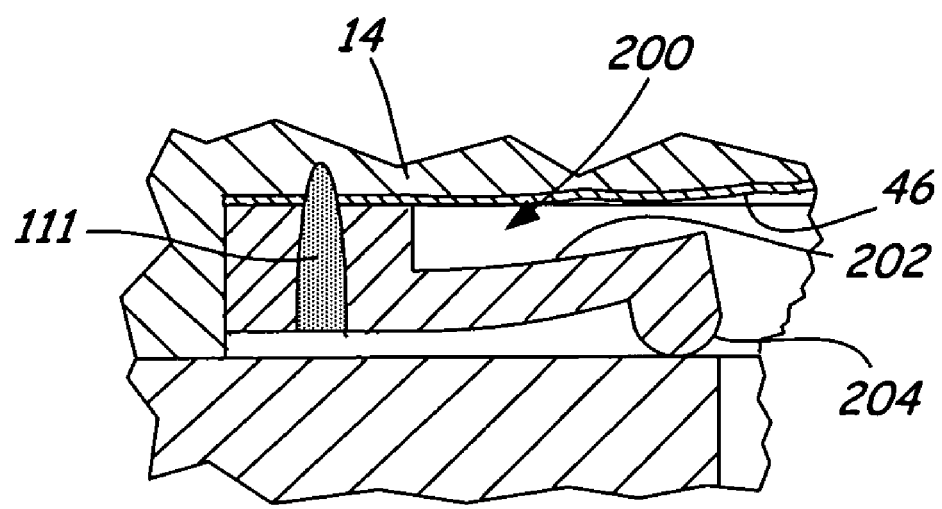

FIGS. 4A and 4B are cross-sectional views of a seal 200 in accordance with another example embodiment of the present invention. Seal 200 comprises a ring that is secured to transmitter body 14 through weld 111. Seal 200 comprises a flexible inward extension 202 which projects radially inwardly from the outer diameter of ring 200 and is of a flexible material. A curved contact region 204 is positioned at an interdiameter of seal 200 and is configured to abut flange 13. In the cross-sectional view of FIG. 4B, the seal 100 has been deformed such that contact region 204 is moved inward due to contact with the flange 13. This provides a relatively small contact area between the contact region and the flange 13 which concentrates force from the process pressure along the contact region 204. The ring 200 should preferably be made of a spring tempered or spring material and be of suitable corrosion resistance to meet the desired application requirements. Cold worked stainless steel or Havar "superalloy" can be used. As discussed above, a ductable material can be coated onto the seal 200, particularly along the contact region 204. The spring force causes the seal 200 to provide a fluidic seal at low process pressures. The self-energizing configuration of the design provides additional sealing force at higher pressures. The configuration does not require additional, non-metallic sealing material. This configuration provides a spring loaded cantalever support for the contact region 204.

Figure 5:
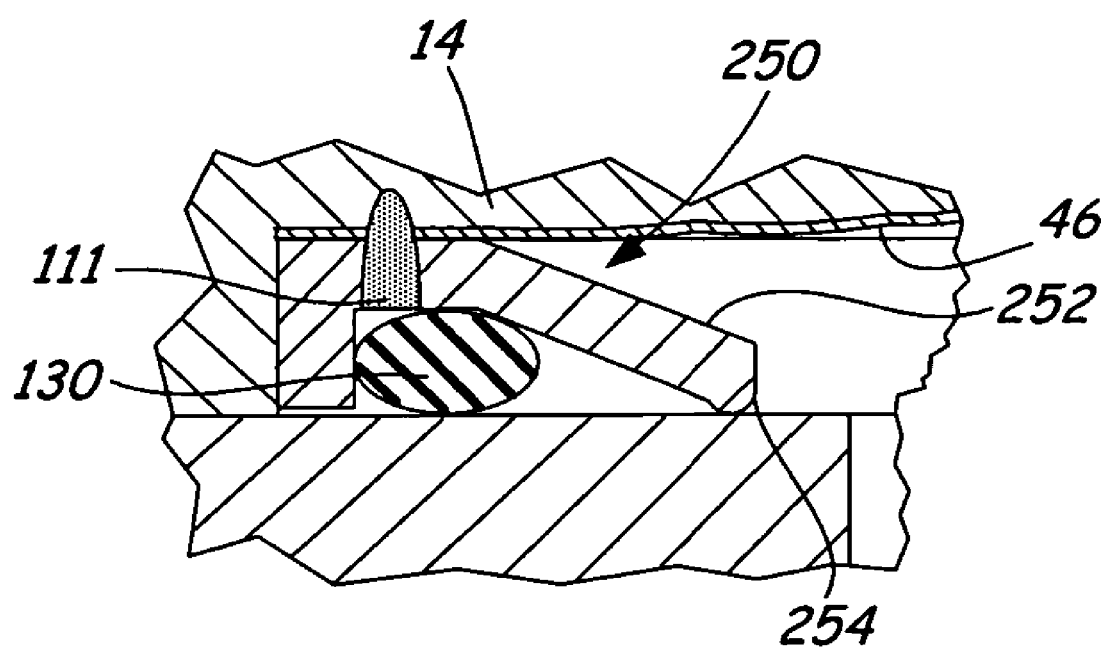
FIG. 5 is a cross-sectional view of a seal in accordance with the present invention which is configured to include an optional gasket.

FIG. 5 is a cross-sectional view of another example embodiment of a seal 250 which includes an inward extension 252 which terminates in an inner diameter curved contact region 254. This configuration is similar to the configuration shown in FIGS. 4A and 4B, however, an optional sealing material 130 can be used to provide additional sealing at low process pressures. A coating of ductable material can be used on the seal 250 of FIG. 5. If such a coating is used, it should at least cover region 254.

The contact region of the metal seal to the flange preferably has a curved profile. This provides a better seal and reduces the likelihood that the metal to metal contact will damage the flange 13.

Although the present invention has been described with reference to preferred embodiments, workers skilled in the art will recognize that changes may be made in form and detail without departing from the spirit and scope of the invention.

What is claimed is:

1. A process control instrument for coupling to a process, the process control instrument being attachable to a metal flange having a first passageway adapted to be filled with process fluid, the process control instrument comprising:
   a body having an opening adjacent to the first passageway for receiving process fluid from the first passageway when the process control instrument is attached to the flange; and
   a seal adapted to be positionable against the flange to prevent process fluid from leaking past the flange, where the seal comprises a metal ring positioned in the opening and coupled to the body, the metal ring configured to provide a metal to metal seal with the metal flange surface to prevent leakage of process fluid therepast.

2. The apparatus of claim 1 wherein the metal ring includes a middle portion between its inner diameter and its outer diameter, wherein the middle portion is arched relative to a surface of the flange and the arch is curved in a direction away from the surface of the flange whereby high process fluid pressures flatten the arch portion in a direction against the surface of the flange.

3. The apparatus of claim 1 wherein the metal ring includes a contact region which is configured to contact the flange.

4. The apparatus of claim 3 wherein the contact region is curved.

5. The apparatus of claim 3 wherein at least the contact region is coated with a ductable material.

6. The apparatus of claim 5 wherein the ductable material comprises nickel.

7. The apparatus of claim 1 including a gasket material along the metal ring configured to seal against the flange, wherein the gasket material is spaced apart from the metal to metal seal.

8. The apparatus of claim 1 wherein the metal ring forms a channel near its outer diameter, and further including sealing material extending along the channel.

9. The apparatus of claim 1 wherein the metal ring is welded to the body.

10. The apparatus of claim 1 wherein the metal ring extends beyond a face of the body when in an unloaded state.

11. The apparatus of claim 10 wherein a sealing force which couples the flange to the body causes deformation of the metal ring from the unloaded state.

12. The apparatus of claim 11 wherein the deformation is a direction away from the surface of the flange.

13. The apparatus of claim 1 wherein the seal includes a contact region and a portion of the metal ring is adapted to bend due to process fluid pressure and force the contact region of the metal ring against the flange.

14. A transmitter for providing an output indicative of a pressure of a process fluid, the transmitter being attachable to a flange having a first passageway adapted to be filled with process fluid, the transmitter comprising:
   a body having an opening adjacent to the first passageway adapted to receive process fluid from the first passageway when the transmitter is attached to the flange, the body also having a second passageway filled with a first fluid and extending from a location adjacent the opening to a sensing means for providing a pressure related output;
   an isolation diaphragm positioned in the opening of the body and separating the opening and the first passageway from the second passageway and thereby adapted to prevent process fluid from entering the first passageway; and
   a seal positioned in the opening to prevent process fluid from leaking from the first passageway and the opening past the flange, the seal comprising a metal ring configured to provide a metal to metal seal against the flange and wherein a sealing force which couples the body to the flange forces a contact region of the metal ring against the flange.

15. The apparatus of claim 14 wherein the metal ring includes a middle portion between its inner diameter and its outer diameter, wherein the middle portion is arched relative to a surface of the flange and the arch is curved in a direction away from the surface of the flange whereby high process fluid pressures flatten the arch portion in a direction against the surface of the flange.

16. The apparatus of claim 14 wherein at least the contact region is coated with a ductable material.

17. The apparatus of claim 16 wherein the ductable material comprises nickel.

18. The apparatus of claim 14 including a gasket material along the metal ring configured to seal against the flange, wherein the gasket material is spaced apart from the contact region.

19. The apparatus of claim 14 wherein the contact region is curved.

20. The apparatus of claim 14 wherein the metal ring forms a channel near its outer diameter, and further including sealing material extending along the channel.

21. The apparatus of claim 14 wherein the metal ring is welded to the body.

22. The apparatus of claim 14 wherein the metal ring extends beyond a face of the body when in an unloaded state.

23. The apparatus of claim 22 wherein a sealing force which couples the flange to the body causes deformation of the metal ring from the unloaded state.

24. The apparatus of claim 23 wherein the deformation is a direction away from the surface of the flange.

* * * * *